Jan. 26, 1926.
A. W. AITKEN
1,571,035
MOTOR VEHICLE
Filed Dec. 12, 1924    3 Sheets-Sheet 3
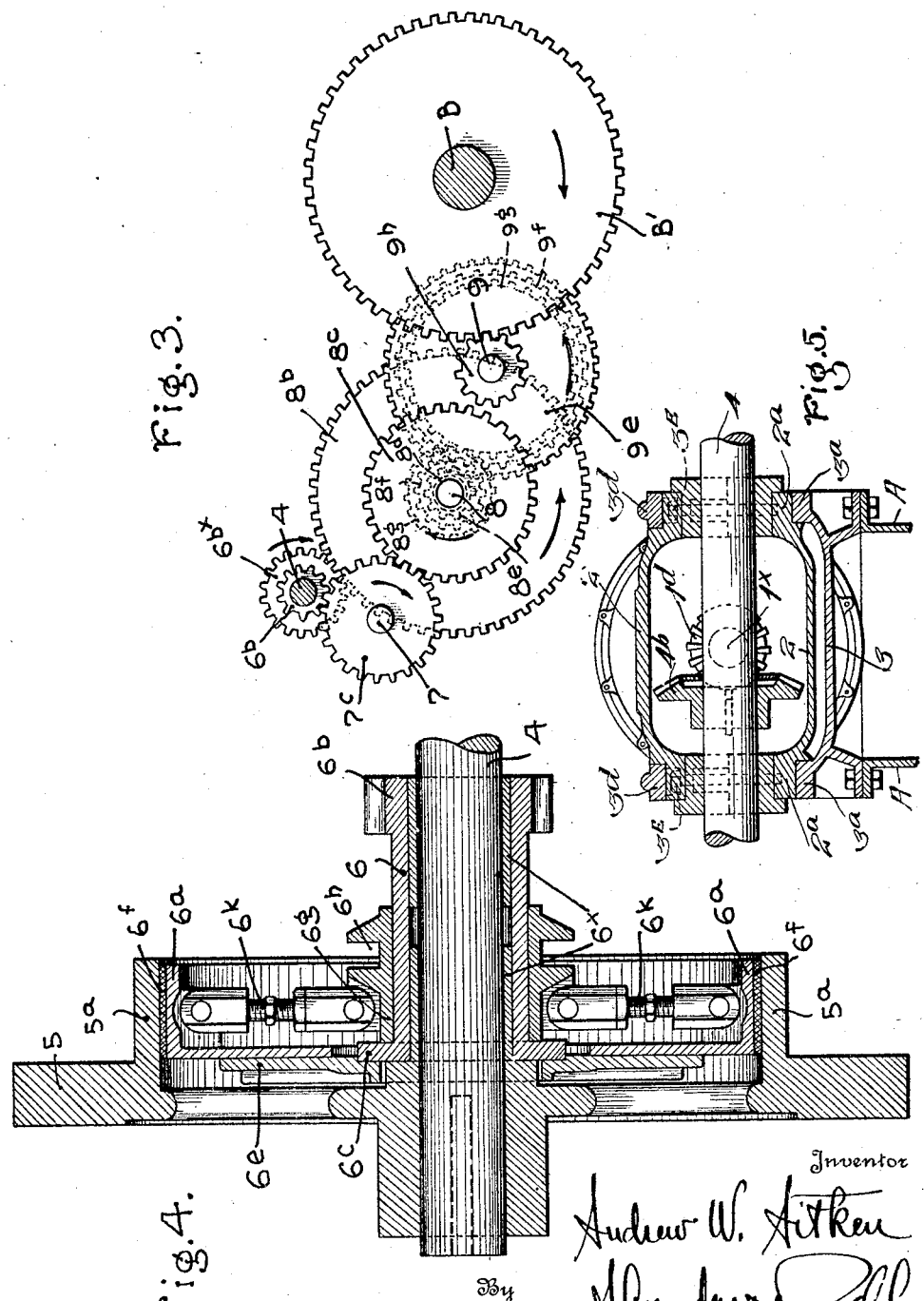

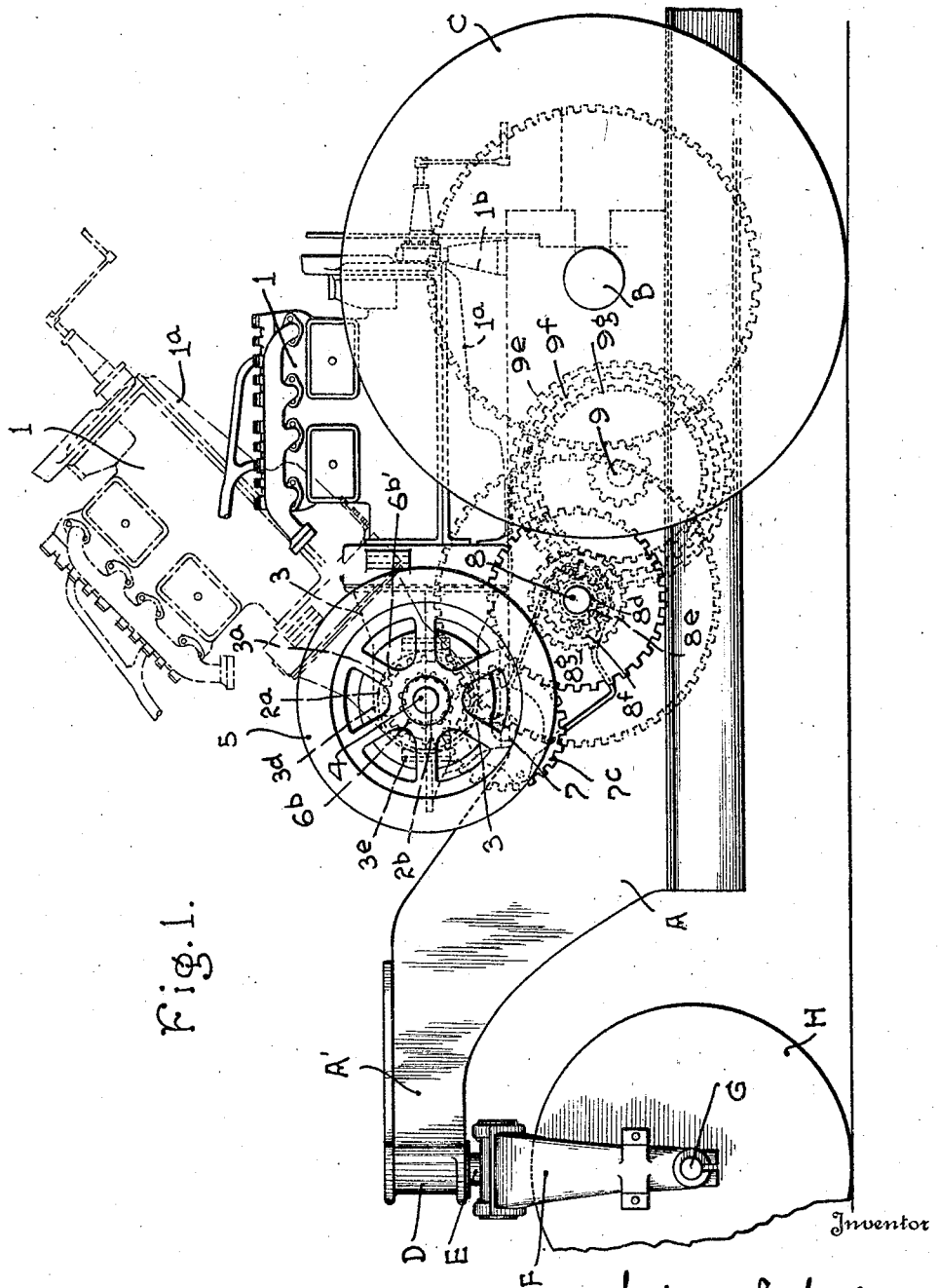

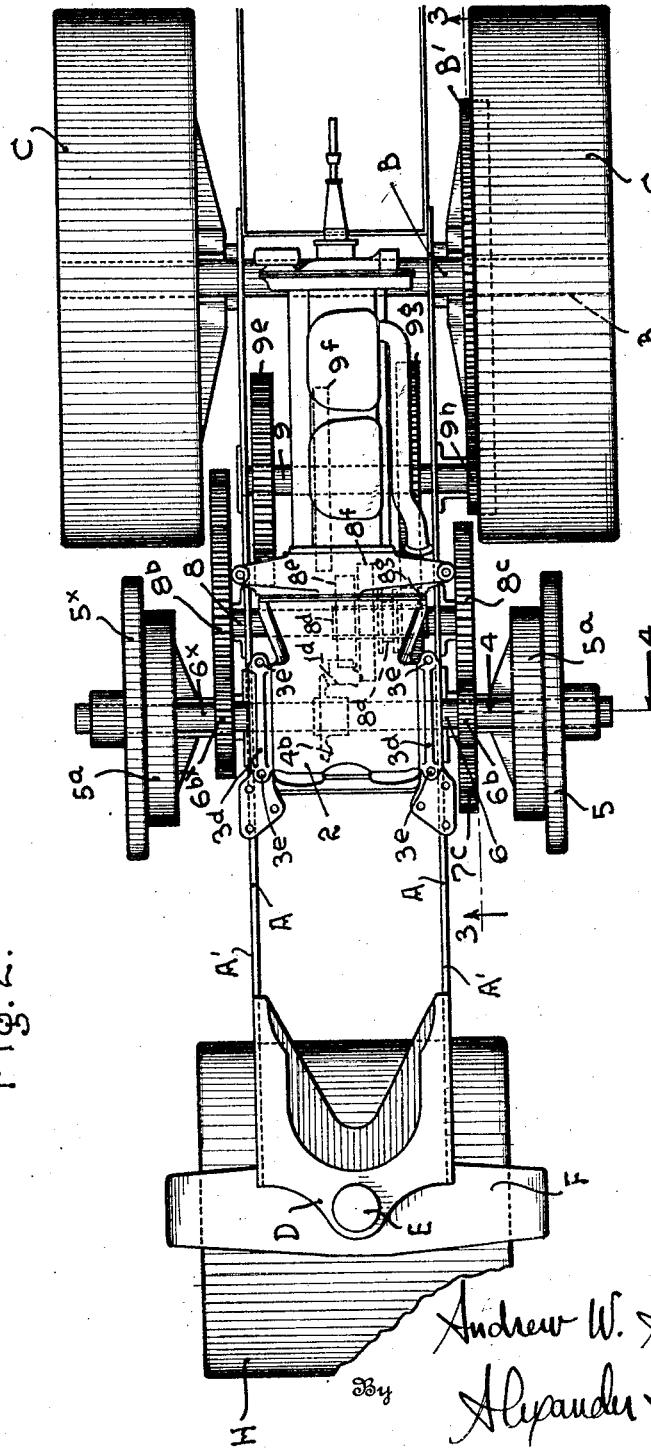

Patented Jan. 26, 1926.

1,571,035

UNITED STATES PATENT OFFICE.

ANDREW W. AITKEN, OF SPRINGFIELD, OHIO, ASSIGNOR TO THE BUFFALO-SPRINGFIELD ROLLER CO., OF SPRINGFIELD, OHIO, A CORPORATION OF OHIO.

MOTOR VEHICLE.

Application filed December 12, 1924. Serial No. 755,522.

*To all whom it may concern:*

Be it known that I, ANDREW W. AITKEN, a citizen of the United States, residing at Springfield, in the county of Clark and State of Ohio, have invented certain new and useful Improvements in Motor Vehicles; and I hereby declare that the following is a full, clear, and exact description thereof, reference being had to the accompanying drawings, which form part of this specification.

This invention is a novel improvement in the driving mechanism of road rollers, tractors, and the like motor vehicles. The principal object of the invention is to provide a novel and simple drive between the motor and the driving axle of such vehicle whereby the vehicle can be started either backward or forward without placing an excessive strain on the motor.

Another object of the invention is to so mount the motor on the vehicle frame that the motor can be swung or tilted on the frame so as to permit ready access to the crank case of the motor without necessitating the removal of the motor from the main frame or the disconnection of the drive between the motor and axle.

A further object of the invention is to provide a motor vehicle or machine, such as a road roller, tractor, or the like with a flywheel shaft geared to the engine shaft, and carrying one or more fly-wheels, and with two trains of gearing between said fly wheel shaft and the driving axle of the vehicle and with clutch devices whereby either train of gearing may be locked to the fly-wheel shaft according to whether it is desired to drive the vehicle forward or backward; the whole being so arranged that the fly-wheel shaft can be driven up to a high speed before either gear train clutch is engaged, and when a gear train clutch is engaged the momentum energy stored in the fly-wheels will be utilized in starting the vehicle from a stand-still (either forward or backward) without materially reducing the speed of motor when the load is thrown on the motor in starting the vehicle.

I will explain the invention with reference to the accompanying drawings, which illustrate one practical embodiment thereof, to enable others to adopt and use the same; and summarize in the claims the essentials of the invention, and the novel features of construction and novel combinations of parts, for all of which protection is desired.

In said drawings:

Figure 1 is a side elevation of a road-roller equipped with my invention, and showing in dot and dash lines the motor in tilted position.

Figure 2 is a top plan view thereof.

Figure 3 is a section on the line 3—3, Figure 2.

Figure 4 is an enlarged sectional view through one of the fly-wheels, and clutches on the line 4—4, Fig. 2.

Figure 5 is a transverse section through the trunnions.

I have illustrated my invention as applied to a road-roller machine of a well-known three-wheel type. Such machine ordinarily has a main frame composed of parallel side members A, A, which extend substantially the full length of the machine, and support the motor and driving mechanism. The said side members are suitably connected together and properly spaced apart as usual. In the rear portions of the side members A, A, is suitably journaled a drive axle B, carrying the usual traction wheels C, C; and the forward ends A', A' of the side members are connected to a casting D in which is journaled the shank E of a yoke F, in which is journaled the steering shaft G of the front roller H. Suitable means are provided (not shown) for turning the yoke to steer the vehicle as usual. The parts thus far described are well known and may be of any desired suitable kind; and the invention is adapted for use in connection with various kinds of motor vehicles or machines.

The motor 1 is preferably a gasolene motor and may be of any suitable type, and is shown as provided with the usual crank case $1^a$, on its lower side. Said motor when in working position is preferably disposed longitudinally of the frame and slightly above the side members A. One end of the motor is preferably mounted upon the frame, or members A, in any suitable manner, (preferably as hereinafter described) so that the motor can be bodily swung on such pivots, and the other end of the motor when in operative position is preferably supported upon a saddle casting $1^b$ mounted upon the members A, A. In operative position the motor is preferably disposed horizontally.

As shown the front end of the motor may be attached to a casting 2 provided with trunnions $2^a$ adapted to fit bearings $3^a$ in casting 3, mounted upon the side members A; the axes of the bearings $3^a$ being preferably disposed horizontally and at right angles to the longitudinal axis of the vehicle. The said bearings $3^a$ are preferably split as shown in Figures 1 and 5, and the upper sections $3^d$ thereof secured by bolts $3^e$, to the lower sections. The bolts $3^e$ can be tightened to bind the trunnions and prevent tilting of the motor 1 under ordinary working conditions; but if it is desired to inspect or repair the motor, bolts $3^e$ can be loosened and the motor 1 then tilted on the trunnions to the position shown in dotted lines in Figure 1.

Extending axially through the trunnions $2^a$ is a fly-wheel shaft 4, which shaft 4 is preferably disposed horizontally in the plane of the axis of the motor shaft. On the shaft 4, preferably exterior to the side members A, A are securely fastened fly-wheels 5, $5^x$ (Figure 1) of any suitable size and weight.

A bevel pinion $1^d$ on the end of the shaft of the motor $1^x$ adjacent the fly-wheel shaft 4 meshes with a bevel pinion $4^b$ keyed on the shaft 4; and shaft 4 is thus geared to and driven by the motor shaft.

The trunnions $2^a$ and the shaft 4 are coaxial, and the rear end of the motor 1 can therefore be raised or lowered as desired while pinions $1^d$ and $4^b$ remain constantly in mesh, regardless of the angular position of the motor. The motor can be tilted upwardly as shown in dotted lines in Figure 1, to permit access to the crank case $1^a$ of the motor without having to remove the motor from the machine, or disturb the gearing between the motor shaft and the fly-wheel shaft.

Slidably but non-rotatably mounted upon the shaft 4 adjacent the fly-wheels 5, $5^x$ are sleeves 6, $6^x$. Each sleeve carries a clutch member adapted to engage an opposed clutch member on the adjacent fly wheel. The clutch may be of any suitable kind. As shown each sleeve is preferably provided with bronze bushings $6^c$ which contact with the shaft 4, and to the end of each sleeve adjacent the fly-wheel is attached a disk or head $6^e$ which may be secured to a flange $6^c$ on the sleeve by bolts as $6^d$.

Preferably radially movable friction shoes $6^a$ are mounted on head $6^e$ and can be caused to engage or disengage an opposed clutch ring $5^a$ on the adjacent fly-wheel and thereby cause the sleeve to rotate with the shaft 4, the sleeve idling when the clutch is disengaged.

The friction shoes $6^a$ (see Figure 4) are shown as approximately L-shaped, and as provided with friction surfaces $6^f$ on their outer ends for engagement with the inner periphery of the opposed clutch flanges $5^a$. Slidably but not rotatably mounted on each sleeve is a clutch collar $6^g$ having an annular groove $6^h$ for engagement with a shifting device or lever (not shown) whereby the collar $6^g$ may be shifted longitudinally of the sleeve. The collar $6^g$ is pivotally connected by adjustable links $6^k$ with the shoes $6^a$ so that when the clutch sleeve $6^g$ is moved in one direction the friction shoes $6^a$ will be engaged with the clutch flange $5^a$, and cause the sleeve 6, (or $6^x$) to rotate with the fly-wheel 5 (or $5^x$) and when the collar $6^g$ is oppositely moved the friction shoes will be retracted out of engagement with the clutch flange $5^a$, permitting the sleeve 6 (or $6^x$) to "idle" upon the shaft 4.

On the sleeve 6 is formed or secured a pinion $6^b$, and on sleeve $6^x$ is formed or secured a pinion $6^{bx}$. Pinion $6^b$ on sleeve 6 is preferably smaller than pinion $6^{bx}$ on sleeve $6^x$.

A counter shaft 8 is journaled in suitable bearings on or in the side members A, A, adjacent shaft 4. A gear $8^b$ fast on shaft 8 meshes with the pinion $6^{bx}$ on sleeve $6^x$. A gear $8^c$ fast on shaft 8 meshes with an intermediate gear $7^c$ (mounted on a stub shaft 7 suitably attached to the main frame) and gear $7^c$ meshes with the pinion $6^b$ on sleeve 6. Hence if sleeve 6 is clutched to shaft 4 or fly-wheel 5, the shaft 8 will be rotated in one direction; and if the sleeve $6^x$ is clutched to shaft 4 or fly-wheel $5^x$ shaft 8 will be rotated in the opposite direction.

A shaft 9 is also journaled in suitable bearings in the main frame parallel with and adjacent the shaft 8. On one end of shaft 9 is a small gear $9^h$ meshing with a large gear B' keyed to the drive-axle B of the vehicle. On shaft 9 are keyed three gears $9^e$, $9^f$, and $9^g$ respectively different in diameter and respectively adapted to be meshed with gears $8^e$, $8^f$, $8^g$ keyed on a sleeve $8^d$ slidably mounted upon the shaft 8. A suitable lever or other device (not shown) is provided for shifting the sleeve $8^d$ on shaft 8, so as to bring any of the pairs of gears $8^e$,—$9^e$; $8^f$,—$9^f$; or $8^g$—$9^g$ into mesh. The said pairs of gears provide means for imparting to shaft 9 three different speeds (forward or reverse) for any constant speed of the fly-wheel shaft. If desired a greater or less number of pairs of gears of different ratios may be used between the shafts 8 and 9.

The usual clutch (not shown) of any suitable kind should be interposed between sections of the crank shaft of the motor which clutch can be operated by a suitable lever or device (not shown) to disconnect the motor crank shaft from the cross-shaft 4, when it is desired to permit the motor to run idly.

The drive axle B of the vehicle can be driven through the described trains of gears in either the forward or reverse direction, according to which sleeve, 6 or 6×, is clutched to shaft 4, as described.

In the operation of road-rollers or tractors the machine is often stopped with either the front or rear wheels, or both, resting in a trough or furrow, and in the ordinary constructions in order to start the machine under such conditions an excessive strain is thrown on the motor as then it must not only develop sufficient power to overcome the inertia of the machine but also to raise or lift the wheels out of such trough or furrow.

In my invention before attempting to start the machine under such circumstances the operator should disengage the clutches which connect sleeves 6 and 6× with the fly-wheel on shaft 4. He should then preferably disengage the clutch (not shown) which connects the motor shaft to pinion 1$^d$ and start the motor. Then he should reengage said clutch (not shown) and the motor will then through the pinions 1$^d$ and 4$^b$ rotate the fly-wheel shaft 4 and fly-wheels 5 and 5×, shaft 4 then turning idly in the sleeves 6 and 6×. When the shaft 4 and fly-wheels have reached a desired speed of rotation the operator should then engage either the clutch sleeve 6 (or 6×) and the related fly-wheel 5 (or 5×) on shaft 4 as described; (according to whether he wishes to drive the machine forward or reverse) without stopping the motor; and by so doing the momentum energy stored in the shaft 4 and fly-wheels 5, 5× will be utilized and assist the motor in starting the machine without shock and without reducing the speed of the motor at the moment of starting. In the example shown, if the sleeve 6 is clutched to the shaft 4 as described, motion will be imparted to the drive axle B in one direction (say reverse) through the train of gears 6$^b$, 7$^c$, 8$^c$, and one or the other of the sets of gears 8$^e$—9$^e$; 8$^f$—9$^f$; or 8$^g$—9$^g$; according to the adjustment of the sleeve carrying the gears 8$^e$, 8$^f$, 8$^g$. If the sleeve 6× is clutched to the shaft 4 or fly-wheel 5×, motion will be imparted to the drive axle B in the other direction (say forward) through the train of gears 6$^b$, 6$^{bx}$, 8$^b$, and one of the pairs of gears 8$^e$—9$^e$; 8$^f$—9$^f$; or 8$^g$—9$^g$, according to the position of the sleeve carrying the gears 8$^e$, 8$^f$, 8$^g$. By shifting the gears 8$^e$, 8$^f$, 8$^g$, any one of three different degrees of speed or power can be transmitted to the drive shaft B in either the forward or reverse movement of the machine.

By my novel arrangement of fly wheels mounted on a counter-shaft 4 instead of on the crank shaft of the motor, and the clutch devices and trains of gears above described, the machine may be readily set in motion at any time, with no appreciable or dangerous strain upon the motor.

At any time it is desired to inspect or repair the motor, the machine can be stopped and the motor swung to the position indicated in dotted lines in Figure 1, as above described, without disengaging the driving connections between the motor and the drive axle of the machine, and without taking down any operative parts of the machine.

I claim:

1. In a motor vehicle of the character specified, a frame, a shaft mounted on the frame, a motor mounted on the frame, the motor being swingable concentric to said shaft; means for driving the shaft by the motor, and change speed gearing between the shaft and the driving axle of the vehicle.

2. In a motor vehicle of the character specified, a frame, a shaft journaled on the frame, a motor mounted on the frame, means for pivoting the motor concentric to the shaft to permit the motor to be tilted, means for driving the shaft by the motor, and change speed gearing between the shaft and the driving axle of the vehicle.

3. In a motor vehicle of the character specified, a frame, a motor having trunnions journaled on the frame; a cross-shaft coaxial with said trunnions; gearing between the motor shaft and said cross-shaft; and means adapted to engage the trunnions to prevent rotation thereof.

4. In a motor vehicle of the character specified, a frame, a motor, a member attached to said motor having trunnions journaled on the frame; a cross-shaft coaxial with said trunnions; gearing between the motor shaft and said cross-shaft permitting the motor to be tilted on said trunnions; and means adapted to engage the trunnions to prevent rotation thereof.

5. In a motor vehicle of the character specified, a frame, a motor disposed longitudinally thereof; a member attached to said motor having trunnions extending at right angles to the axis of said motor, means for rotatably supporting said trunnions on the frame; a cross shaft coaxial with said trunnions; intermeshing gears on the motor crank shaft and cross-shaft, whereby the motor may be tilted on said trunnions; and means adapted to engage the trunnions to prevent tilting of the motor.

6. In a motor vehicle of the character specified, a frame, a motor pivotally mounted thereon; a fly-wheel shaft mounted coaxial with the pivots of said motor; driving connections between the motor and the fly-wheel shaft; and gearing between said fly wheel shaft and the driving axle of the vehicle.

7. In a motor vehicle of the character specified, a frame, a motor mounted thereon having trunnions extending at right angles to the axis of the motor shaft; a fly-wheel shaft mounted coaxial with said trunnions; a fly-wheel on said shaft; gearing between the motor and fly-wheel shaft; and gearing between said fly-wheel shaft and the driving axle of the vehicle.

8. In a motor vehicle of the character specified, a frame, a normally horizontally disposed motor thereon; a member attached to said motor having trunnions extending at right angles to the axis of the motor shaft; means for supporting said trunnions on the frame; a fly-wheel shaft mounted coaxial with said trunnions; a fly-wheel on said shaft; gearing between the motor shaft and fly-wheel shaft; and gearing between said fly-wheel shaft and the driving axle of the vehicle.

9. In a motor vehicle of the character specified, a frame, a motor thereon having trunnions extending at right angles to the axis of the motor shaft; means for supporting said trunnions on the frame; a fly-wheel shaft mounted coaxial with said trunnions; a fly-wheel on said shaft; gearing between said fly-wheel shaft and the driving axle of the vehicle; and intermeshing gears on the motor shaft and cross-shaft, permitting the motor to be tilted to give access to the crank case.

10. In a motor vehicle of the character specified, a frame; a motor thereon; a fly-wheel shaft on the frame; gearing between the motor shaft and the fly-wheel shaft; a fly-wheel on said fly-wheel shaft; a train of gears between the fly-wheel shaft and the vehicle drive-axle; and a clutch carried by said fly-wheel for connecting said train to the fly-wheel shaft.

11. In a motor vehicle of the character specified, a frame; a motor thereon; a fly-wheel shaft on the frame driven by said motor; a fly-wheel on said shaft; a pair of gear trains between the said shaft and the drive-axle of the machine; and clutch mechanisms for operatively engaging either gear train with the fly-wheel shaft.

12. In a motor vehicle of the character specified, a motor; a fly-wheel shaft driven by said motor; a fly-wheel on said shaft; a sleeve rotatably mounted on said shaft; a gear train between said sleeve and the vehicle drive-axle; and a clutch member on said sleeve adapted to engage an opposed clutch member on said fly-wheel.

13. In a motor vehicle of the character specified, a motor; a fly-wheel shaft driven by said motor; a pair of fly-wheels keyed on said shaft; sleeves rotatably mounted on said shaft adjacent said fly-wheels; a gear on each sleeve; a gear train between each sleeve gear and the vehicle drive-axle; one train containing one more gear than the other train, and means for operatively engaging or disengaging the sleeves and shaft.

14. In a motor vehicle of the character specified, a motor; a fly-wheel shaft; means for driving said shaft from the motor; a fly-wheel on said shaft; a pair of pinions loosely mounted on said shaft; a gear train between each pinion and the drive-axle of the vehicle; one train containing one more gear than the other train, and clutch means for operatively engaging either pinion with the fly-wheel shaft.

15. In a motor vehicle of the character specified, a motor, a fly-wheel shaft; gearing for driving said fly-wheel shaft from the motor; a fly-wheel on said shaft; a pair of sleeves rotatably mounted on said shaft; a gear on each sleeve; a gear train between each sleeve gear and the drive axle of the vehicle, one train containing one more gear than the other train, and clutch means for engaging either sleeve with the shaft.

16. In a motor vehicle of the character specified, a motor, a fly-wheel shaft; gearing for driving said fly-wheel shaft from the motor; a pair of fly-wheels on said shaft; a gear rotatably mounted on said shaft adjacent each fly-wheel; a gear train between each gear and the drive axle of the vehicle, one train containing one more gear than the other train, and clutch means for engaging either gear with the shaft.

17. In a motor vehicle of the character specified, a motor, a fly-wheel shaft; gearing for driving said fly-wheel shaft from the motor; a pair of fly-wheels on said shaft; a sleeve rotatably mounted on said shaft adjacent each fly-wheel; a gear on each sleeve; a gear train between each sleeve gear and the drive axle of the vehicle, one train containing one more gear than the other train, and clutch means for engaging either sleeve with the shaft.

18. In a motor vehicle of the character specified, a motor, a fly-wheel shaft; gearing for driving said shaft from the motor shaft; a pair of fly-wheels on said fly-wheel shaft; a sleeve rotatably mounted on said fly-wheel shaft adjacent each fly-wheel; a gear on each sleeve; a gear train between each sleeve gear and the drive axle of the vehicle; one train containing one more gear than the other train, and clutch means for engaging either sleeve with its related fly-wheel.

19. In a machine of the character specified; a motor, a drive axle; a fly-wheel shaft; gearing between the motor shaft and the fly-wheel shaft; a fly-wheel fixedly mounted on said fly-wheel shaft; a sleeve slidably and rotatably mounted on the fly-wheel shaft adjacent the fly-wheel; clutch devices for locking the sleeve to the related fly-wheel; a pinion on the sleeve; and a train of gearing between such sleeve pinion and the drive axle of the vehicle.

20. In mechanism as set forth in claim 19 the motor being mounted so that it can be moved or swung on an arc concentric with the fly-wheel shaft without disengaging the gearing between the motor and said fly-wheel shaft.

21. In a machine of the character specified a motor; a drive axle; a fly-wheel shaft; gearing between the motor shaft and the fly-wheel shaft; a pair of fly-wheels fixedly mounted on said fly-wheel shaft; a sleeve slidably and rotatably mounted on the fly-wheel shaft adjacent each fly-wheel; clutch devices for locking each sleeve to its related fly-wheel; a pinion on each sleeve; and a train of gearing between each sleeve pinion and the drive axle of the vehicle whereby the vehicle may be driven forward or backward according to which sleeve is engaged with its fly-wheel.

22. In mechanism as set forth in claim 21 the motor being mounted so that it can be moved or swung on an arc concentric with the fly-wheel shaft without disengaging the gearing between the motor and said fly-wheel shaft.

23. In a motor vehicle, a motor; a cross-shaft driven by said motor; a fly-wheel on said cross-shaft; a gear train for driving said vehicle; a clutch in said motor shaft; and a clutch within said fly-wheel for connecting said cross-shaft with said gear train; whereby energy may be stored in the fly-wheel and dissipated in starting the vehicle.

24. In a motor vehicle, a motor; a cross-shaft driven by said motor; a fly-wheel on said cross-shaft; a gear train for driving said vehicle; a clutch in said motor shaft; and a clutch within said fly-wheel having a gear meshing with said gear train; whereby the cross-shaft may be rotated by said motor, and energy stored in said fly-wheel dissipated in starting the vehicle.

25. In a motor vehicle, a motor; a cross-shaft driven by said motor; a pair of fly-wheels on said cross-shaft; a pair of gear trains for driving said vehicle; a clutch in the motor shaft; and clutches within said fly-wheels each having a gear meshing with its respective gear train; whereby the cross-shaft may be rotated by said motor, and the energy stored in the fly-wheels dissipated in starting the vehicle.

26. In a motor vehicle, a motor; a cross-shaft driven by said motor; a pair of fly-wheels on said cross-shaft; a gear train for driving said vehicle in forward direction; a gear train for driving said vehicle in reverse direction; a clutch in the motor shaft; and clutches engaging said fly-wheels each having a gear meshing with its respective gear train; whereby the cross-shaft may be rotated by said motor, and the energy stored in the fly-wheels dissipated in starting the vehicle in either forward or reverse direction according to which fly-wheel clutch is engaged.

27. In a motor vehicle, a motor; a cross-shaft driven by said motor; said motor being pivotally mounted coaxially with said cross-shaft; a pair of fly-wheels on said cross shaft; a gear train for driving said vehicle in forward direction; a gear train for driving said vehicle in reverse direction; a clutch in said motor shaft; and clutches within said fly-wheels each having a gear meshing with its respective gear train; whereby the cross-shaft may be rotated by said motor, and the energy stored in the fly-wheels dissipated in starting the vehicle in either forward or reverse direction according to which fly-wheel clutch is engaged.

In testimony that I claim the foregoing as my own I affix my signature.

ANDREW W. AITKEN.